US005697047A

United States Patent [19]

Nicholson

[11] Patent Number: 5,697,047
[45] Date of Patent: Dec. 9, 1997

[54] AUTOMATED OPTOELECTRONIC SWITCHED DISTRIBUTION SYSTEM

[76] Inventor: Victor Nicholson, 5225 Pooks Hill Rd., #1704-S, Bethesda, Md. 20814

[21] Appl. No.: 246,420

[22] Filed: May 20, 1994

[51] Int. Cl.$^6$ .............................. H04H 1/00; H04N 7/10; H04N 7/14
[52] U.S. Cl. ........................... 455/5.1; 348/12; 348/13
[58] Field of Search ........................... 348/12, 13, 14, 348/15, 16, 17, 7, 8, 723; 455/4.1, 4.2, 5.1; H04N 7/10, 7/14

[56] References Cited

U.S. PATENT DOCUMENTS

| | | | |
|---|---|---|---|
| Re. 31,639 | 7/1984 | Nicholson | 455/4.2 |
| 4,771,456 | 9/1988 | Martin et al. | 380/10 |
| 4,901,367 | 2/1990 | Nicholson | 455/4.2 |
| 4,994,909 | 2/1991 | Graves et al. | 348/7 |
| 5,181,106 | 1/1993 | Sutherland | 348/7 |
| 5,245,420 | 9/1993 | Harney et al. | 348/7 |
| 5,387,927 | 2/1995 | Look et al. | 455/4.1 X |
| 5,488,413 | 1/1996 | Elder et al. | 455/4.1 X |

*Primary Examiner*—John K. Peng
*Assistant Examiner*—John W. Miller
*Attorney, Agent, or Firm*—James Creighton Wray

[57] ABSTRACT

The present invention relates to an automated optoelectronic switched distribution system. A head end switching control center is provided. Optical fibers are connected to the head end switching control center. Subsidiary switching control centers (SCC) are connected to the optical fibers. Coaxial feeders are connected to the subsidiary switching control centers. Subscribers are connected to each feeder. Each feeder can carry numerous channels and each subscriber is connected to at least two allocated channels from the feeder. The subsidiary switching control center has remote switching and processing converters for receiving signals from the optical fibers and transmitting signals to a channel allocated to an individual subscriber. Each subsidiary switching control center has a remote switching and processing converter-transmit to receive signals from a subscriber's allocated transmit channel and to direct that signal to an output channel. The subsidiary SCC's may be automatically connected to each other via the area headend by single-mode optical fibers. Each SCC is allocated a designated spectrum of frequencies for automated reception of incoming 2-way channels. Each SCC can receive additional one-way and interactive channels on the same as well as additional optical fibers.

17 Claims, 3 Drawing Sheets

AUTOMATED OPTOELECTRONIC SWITCHED DISTRIBUTION SYSTEM

SUMMARY OF THE INVENTION

The present invention provides a means to supplement the projected National Information Infrastructure for Internet, Distant Learning, Libraries etc, with a regional broadband "last-mile" two-way switched distribution system for consumer-oriented, universal-access, low-cost, simultaneous full-motion video and giga-speed data with privacy and security of service.

This brings to fruition the vision of Vice-President Albert Gore who stated, "Telecommunications requires . . . the rapid development of a nationwide, advanced, interactive, interoperable broadband communications infrastructure to every business, educational and health care institution and home in America."

This advanced technology infrastructure can 1) revitalize inner cities by enabling work training, access to jobs and increased security, 2) upgrade quality of life in rural areas by enabling distant learning to all classrooms and telecommuting to distant jobs, 3) reduce auto commuting with its accompanying gas consumption, toxic pollutants, stress, and high cost of building and repairing highways, and 4) enable compliance with the Americans with Disabilities Act and the Clean Air Act Amendments.

The present invention builds on the BUSS and RSPC patented features of patent Reissued Pat. No. Re. 31,639, Bidirectional Unicable Switching System, and U.S. Pat. No. 4,901,367, Cable Communications System with Remote Switching and Processing Converters.

These patents dedicate a private frequency spectrum on a coaxial cable to each user for 1) broadband remote reception of desired programs, 2) each subscriber independently selecting the program to be sent on the dedicated channel, 3) delivering a descending order of television frequencies to subscribers on a the feeder cable, 4) using the same feeder cable to transmit back a control signal to select the desired program, and 5) sending back a television signal on the assigned channel for two-way television between any two users.

The present automated optoelectronic switched distribution invention is consumer oriented for city-wide two-way fine definition analog video and mega-speed digital transmissions via optoelectronics (optical fibers and/or coaxial electronics). It expands the capabilities inherent in U.S. Pat. Nos. 4,901,367 and Re. 31,639 that include dedicated channels and user-controlled broadband 2-way service within the service area of Switching Control Centers (SCC) by including automated low cost 2-way universal-access service between users located in distant SCCs.

Important features of the invention include:

System design whereby signals from distant SCCs are transmitted using single-mode optical fibers and automatically connected at the headend to each other using frequency division of groups of channels.

Subscriber's transmit RF channels include a digitally modulated subcarrier with the address of the designated SCC and subscriber.

Each SCC is allocated a designated spectrum of frequencies for automated reception of the incoming 2-way channels.

Each SCC can receive hundreds of one-way and interactive channels on additional downstream optical fibers.

Each SCC transmits tiers of 2-way channels to the headend for automatic distribution to all other SCCs in the city.

Each RSPC-T can select from many subscriber transmit channels and convert it to a designated fiber transmit RF channel in a desired group of channels oriented toward the receiver's distant SCC.

Nearby SCCs can be automatically connected to each other using coaxial cable 2-way VHF designated channels. This enables an SCC with a limited number of 2-way users to access another and thereby greatly reduce 2-way transmission costs by frequency division and time-sharing of the same single-mode optical laser.

By providing a subscriber with dual RSPCs, pic in pic dual video pictures or simultaneous fine definition for television plus high speed computer data are enabled.

The new automated switched distribution has the following capabilities:

User access to a choice among thousands of fine definition video channels transmitted via optical fibers—movies, videos, sports, home shopping, distant learning, electronic publishing, medical, social and governmental services.

Use of time-sharing and frequency division for reduced cost of access to single-mode optical fibers. Note that it costs $8000 to access a laser transmitter for 1 or 80 television channels. Remote Switching Control Centers are essential for frequency division and time-sharing for consumer-oriented low-cost applications.

Giga-speed access to Internet by users that would reduce cost and enable privacy of service. This is of major imprtance to help protect corporate secrets.

Simultaneous business transmission and/or reception of analog full-motion television and digital giga-speed digital signals. This enables immediate access advanced technology desk-top video conferencing with images, charts and graphics. Universal-access capability can save businesses the cost of ISDN private lines and picture quality will be improved by eliminating compressed video.

Simultaneous subscriber reception of dual video channels for pic in pic television.

Simultaneous transmission and reception of video and high speed data for collaborative multimedia telecommuting by executives, engineers and scientists.

Capability to meet the objectives of the FCC and the EIA that cable set-top boxes be interoperable—so consumers can own and be able to replace their set converters in a similar manner to their telephones. This would eliminate reception problems caused to VCRs and cable-ready TV sets by CATV descrambling converters.

Development of multi-functional Telework Centers that could upgrade quality of life and revitalization of communities.

In this advanced technology fiber optic service, single-mode optical fiber cables (⅜ dia.) can contain up to 144 fibers. Each fiber—the thickness of a human hair—can transmit up to 80 TV channels. Each Switching Control Center dedicates a spectrum with the desired number of television channels for signal transmission to each of the others. Each SCC can receive up to 80 channels per fiber as transmitted from other SCCs.

Activation of 2-way video service between subscribers in distant SCCs can be done in several ways, 1) for full time private lines, dedicated channels are assigned to the parties, or 2) for random access, there is a need to select available 2-way transmit and receive channels between the SCCs and enable billing for time of service.

The following is an example of Procedure For Random-Access Service:

Subscriber telephones desired co-user to determine their SCC and feeder numbers plus receive and transmit channels.

Subscriber provides this information to controller at system headend and receives authorization to commence service on available equipment and optical fiber.

Subscriber's transmissions will be sent to an unused RSPC-T, in their SCC, whose input and output channels are automatically switched to an available fiber transmit channel enroute via the system headend, to the other party's SCC and designated receive RSPC.

The other party's transmissions will be similarly switched to the original subscriber.

Service will be discontinued after an authorized time interval.

The new system provides Privacy and Security of Service whether for 2-way transmissions of multimedia confidential high speed digital computer and/or fine-definition, full-motion video applications, there is complete privacy and security of service. Signals are only sent upon request and are transmitted only to the receive party's channel. In the event additional security is desired, computer signals can be encrypted and television pictures scrambled.

In enhanced remote switching applications, each subscriber is allocated two or more private 6-MHz bandwidth channels on a coaxial feeder cable using BUSS inverse spectrum design. Subscribers willalso use expanded remote switching and processing capabilities for:

Reception of dual channels for TV "pic in pic" or for simultaneous analog television and high speed digital signals for computers or digital/compressed video converter. Requires use of dual RSPCs.

Simultaneous transmission and reception of television or computer signals. Requires use of dual RSPCs.

Reception of enhanced quality TV or HDTV that requires use of RSPCs modified to incorporate wider bandwidth tuner, IF amplifier, modulator and filter. Users would be allocated a wider bandwidth dedicated channel on the feeder cable.

Remote control functions for reception and transmission that will be supplemented with parental control and automated switched distribution.

The new system provides automated switched distribution. A feature of the patent is the use of single-mode optical fibers not only to interconnect the headend with other systems but also for automated switching between Switching Control Centers and subscribers. For universal access, low-cost, video and computer applications, automated switching of two-way services is essential.

In addition, the use of specified spectra simplifies automatic switching of channels at the headend from an upstream optical fiber to a downstream fiber enroute to the designated user.

The present invention incorporates automated interconnection of distant subscribers for 2-way video, detailed as follows:

Subscriber 01-24-23-06 located in SCC-1, transmits RF channel 24 and receives channel 23 on feeder 6. Subscriber 03-06-05-08 in SCC-3, transmits channel 6 and receives channel 5 on feeder 8. (see FIG. 2)

Fiber Transmissions Between SCC-1 and SCC-3 Via Headend

From SCC-1, an optical laser includes channel group B (11–20) via an optical fiber to the headend for frequency division switching and modulation onto another fiber enroute to SCC-3.

From SCC-3, an optical laser includes channel group D (31–40) via an optical fiber to the headend for frequency division switching and modulation onto another fiber enroute to SCC-1.

Procedures by System Controller

Receives telephone call from subscriber 01-24-23-06 to authorize immediate 2-way transmissions with subscriber 03-06-05-08 for a given time interval, bills for the service and does the following:

Notes that Channel 15, is available to transmit from SCC-1 to SCC-3 and that channel 34 is available from SCC-3 to SCC-1.

Transmissions from SCC-1 to SCC-3

Assigns an RSPC-T in SCC-1 for transmission, remotely switches feeder 6 to its input, remotely tunes its input to channel 24 and its output to channel 15 for fiber transmission to SCC-3.

Assigns an RSPC-T in SCC-3 for reception, remotely tunes its input to channel 15, its output to channel 5, and remotely switches this output to feeder 8. FIG. 3B Transmissions from SCC-3 to SCC-1

Assigns an RSPC-T in SCC-3 for transmission, remotely switches feeder 8 to its input, remotely tunes its input to channel 6 and its output to channel 34 for fiber transmission to SCC-1.

Assigns an RSPC-T in SCC-1 for reception, remotely tunes its input to channel 34, its output to channel 23, and remotely switches this output to feeder 6.

The invention provides switching control centers for universal access, two-way broadband distribution involving frequency division and time-sharing. Each SCC is assigned a group of wideband channels for reception and transmission to other SCCs. An SCC does not transmit groups of channels to itself via the headend.

Example

Assume each of 4 SCCs is allocated 3 designated groups, each with 10, 6 MHz bandwidth channels, for transmission and reception.

| Channel Groups | SCC * Sends To | Reception at SCC Number | | | |
|---|---|---|---|---|---|
| | | #1 | #2 | #3 | #4 |
| A (1–10) | SCC-1 | — | C | B | D |
| B (11–20) | SCC-2 | A | — | D | C |
| C (21–30) | SCC-3 | D | B | — | A |
| D (31–40) | SCC-4 | B | A | C | — |

This chart describes 90 channels being transmitted one-way using single-mode optical fibers. For two-way applications there need be dual fibers—one in each direction. There is capability for low-cost two-way channel capacity throughout a city as:

Each fiber can transmit up to 80 channels one-way.

144 fibers—each the thickness of a human hair—can be installed within a single ⅜ inch diameter fiber cable.

Multiple fiber cables can be installed in ducts along highways.

Broadband Switched Distribution Reduces Cost by:

Frequency division where multiple users can share the same fiber using different channel frequencies.

Time-sharing of RSPC-Ts, fibers, optical lasers and electronics.

The optical laser for transmitting broadband RF channels onto a single-mode fiber costs $8,000 whether used by 1 or 80 subscribers. It surely is not cost effective for each user to have their own fiber laser and wire. Remote switching control centers enable up to 80 users to share the laser and fiber simultaneously and for hundreds of users to time-share them during a day.

SCC Transmission/Receiving

Within each SCC there are a bank of RSPC-Ts for time-sharing transmission and reception of channels to and from the headend. The input and output tuners of each RSPC-T are remotely switched to the authorized channels by the controller at the headend as are switches that interconnect to the desired feeder enroute to the subscriber.

Within the "last mile" distribution of each SCC, coaxial feeder cables link groups of subscribers to their SCC. Each feeder from a single SCC can interconnect up to 33 dual channel (transmit and receive) channels using the VHF and UHF spectra for 12 MHz bandwidth for each subscriber.

The use of BUSS patented "inverse spectrum" enables coaxial cables to extend for more than a mile by assigning the most distat subscriber the lowest frequency channels— that have the lowest cable attenuation.

Each subscriber's transmit channel, to subscribers not connected to the same SCC, is fed via their assigned feeder to an authorized RSPC-T to the headend and to the designated receiver. Similarly the subsciber is assigned another RSPS-T temporarily for reception of transmissions from the other authorized subscriber.

These and further and other objects and features of the invention are apparent in the disclosure, which includes the above and ongoing written specification, with the claims and the drawings.

DETAILED DESCRIPTION OF THE DRAWINGS

Figure 1:
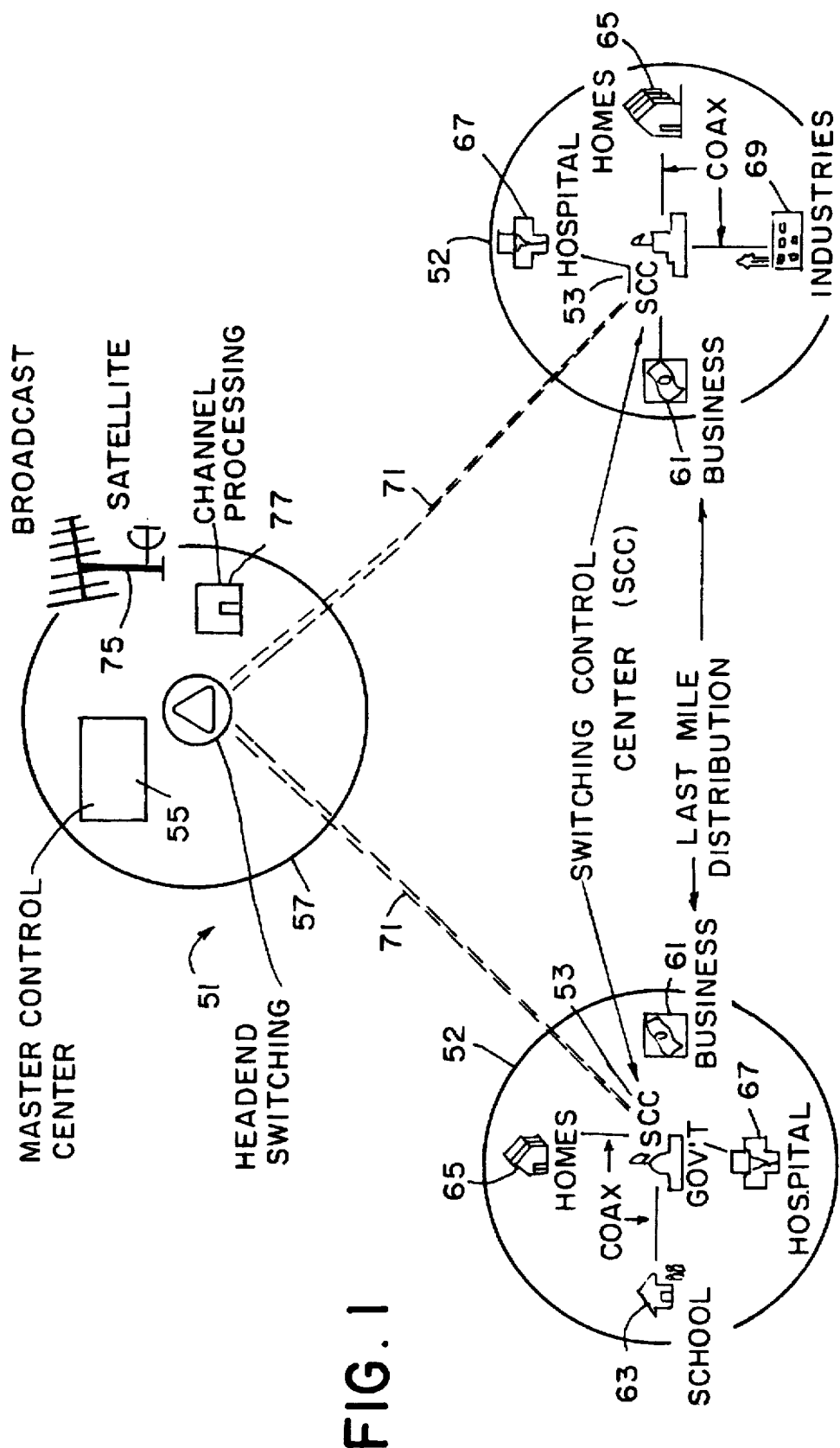
FIG. 1 is a schematic representation of the "last mile" distribution system of the invention showing individual connected switching control centers and subscribers connected to the switching control centers, and the interconnections between switching control centers.

Referring to the drawings, the distribution system of the present invention is generally indicated by the numeral 51. The large lower circles 52 represent local areas with multiple subscribers in each local area. Each local area has a switching control center 53. As shown in FIG. 1, the master control center 55 is at the head end 57 of a cable or other two-way system 51. Coaxial feeder cables 59 connect the switching control centers 53 to businesses 61, schools 63, residences 65, hospitals 67 and industries 69. The individual subscribers 61–69 may communicate with each other via two-way totally interactive systems operating through a local switching control center 53. The businesses 61, schools 63 and residences 65 can communicate with subscribers at distance locations by first going through the local switching control center 53, and then through the fiber optic cable 71 to the head end switching control center 73, then out through other fiber optic cables 71 to other remote switching control centers 53, and then to the selected subscriber over coaxial feeder cables 59.

When communication operates within a single area 52, the input can go from a local subscriber such as 61–69 to another local subscriber through the local switching control center 53. When the communication goes to an immediately adjacent area through a nearby switching control center, the head end switching control center may be bypassed, sending the information directly through a coaxial cable or fiber to the nearby switching control center, and then to the subscriber in that nearby area which is served by that switching control center. In most cases, when the subscriber is not within the area 52 which is served by a switching control center 53, the communications will go through one switching control center 53, through a fiber optic cable 71 to the head end switching control center 57, and then back through a fiber optic cable 71 to the switching control center 53 which serves the area 52 of the addressed subscriber 61–69.

Antennas 75 are connected to the channel processing unit 77 to send and receive signals and to provide those signals to the head end switching under control of the master control center 55, as appropriate.

Figure 2:
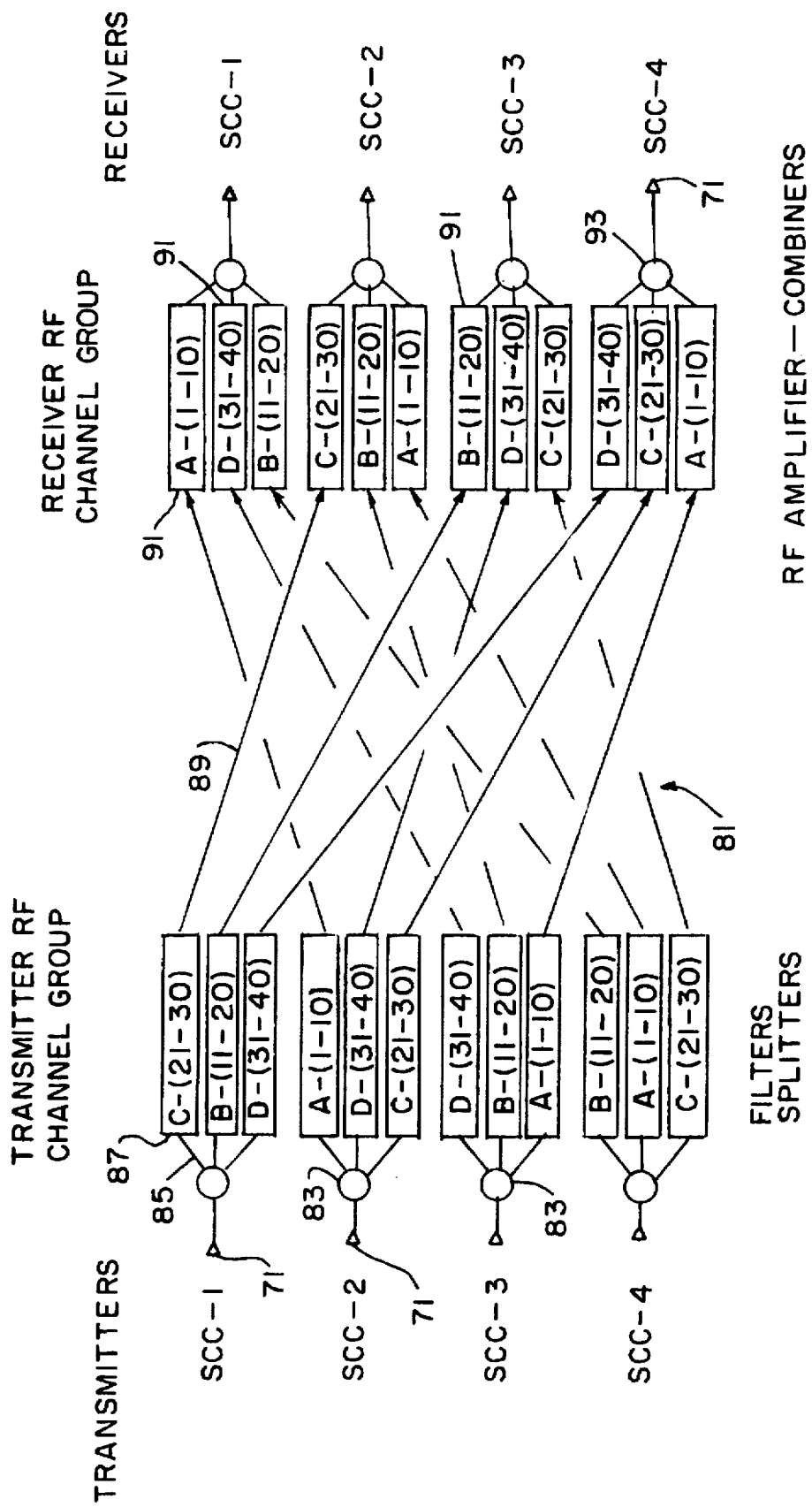
FIG. 2 is a schematic representation of automatic two-way switching in tiers of channels.

FIG. 2 shows automatic switching at a head end generally indicated by the numeral 81. The head end includes a number of fiber optic cables 71 from the individual switching control centers herein schematically represented by four centers SCC-1, SCC-2, SCC-3 and SCC-4. The signals from the fiber optic cable 71 are provided to splitters 83, and then all of the signals are provided to the lines 85 and to filters 87 for groups of channels. The filters 87 accept the channels that are assigned to that filter, for example in SCC-1 the upper filter receives the channel group C, which includes channels 21–30. The next filter accepts the channel group B, which includes channels 11–20, which are to be directed to SCC-3. A matrix 89 connects the transmitters in SCC-1 through SCC-4 to the receivers for the different SCC's.

The amplifier filters 91 connected to the receivers of the SCC's are connected to the respective transmitter filters 87 by the matrix 89. In the example, the middle filter 87 in SCC-1 is connected by the matrix 89 to the upper amplifier filter 91, which is connected to SCC-3, as shown in the drawings.

The amplifier filters 91 are connected to combiners 93 which combine all of the signals into the fiber optic cables 71, which provide the signals to the respective SCC's.

The head end 81 includes the splitters 83, the filters 87, the matrix 89, the amplifier filters 91, and the combiners 93.

Each of those elements is a simple, non-complex, off-the-shelf element which is ready for immediate service. There is no limit to the number of SCC's that may be conveniently coupled at a head end, provided that a combiner connects a filter, which is in turn connected by the matrix to an amplifier filter connected by a combiner to the appropriate fiber optic cable 71.

A single fiber 71 may handle 80 channels and a ⅛ inch fiber cable can contain 144 fibers, each the thickness of a human hair, so that twice the number of SCC's, as shown in the example on FIG. 2, could be connected at a head end which was in turn connected to each SCC by a single fiber. Obviously many SCC's could be connected by a single head end.

The system shown in FIG. 2 may be replicated for connecting number of head ends to carry signals through a large city, through a region, interstate or beyond.

The fibers 71 might be replaced in long distance or communications with remote areas by satellite transmissions or by any convenient communication form.

Figure 3:
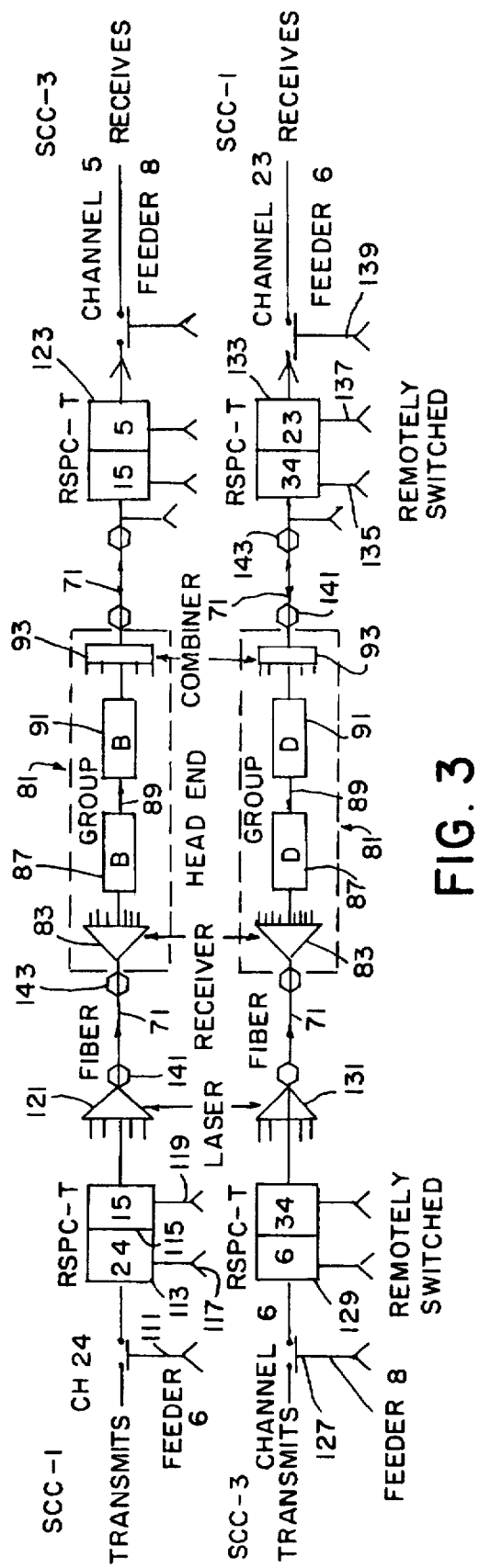
FIG. 3 is a schematic representation of two-way universal access with automatic switching with remote switching and processing converter-transmit (RSPC-T) transmission converters.

Referring to FIG. 3, the interconnections between SCC-1 and SCC-3 are schematically shown as an example. A subscriber's address at SCC-1 is shown as 01-24-23-06. That subscriber wishes to communicate with a subscriber at SCC-3 whose address is 03-06-05-08.

The subscriber at SCC-1 transmits on channel 24 over feeder 6. A switch 111 connects channel 24 to the channel 24 receptor filter 113 at the RSPC-T at SCC-1. The channel interfaces 115 are remotely switched by connectors 117 and 119 to place channel 24 on channel 15 for transmission purposes. Channel 15 is combined by combiner 121 and to fiber 71. The dashed lines represent the head end 81 with the splitter 83, the filter 87, the matrix 89, the amplifier filter 91, and the combiner 93. Channel 15 is placed on an optical laser transmitter which connects the signals to the fiber 71.

Channel 15 is received within the SCC-3 by the RSPC-T converter 123. The converter 123 converts the channel 15 to channel 5, which is assigned to the intended subscriber, and channel 5 is supplied to that subscriber over feeder 8.

The two-way communication is represented in FIG. 3 for demonstration purposes by switching sides of the subscribers and the SCC's. SCC-3's subscriber 03-06-05-08 transmits over channel 6, which is connected to feeder 8. The feeder 8 is connected by switch 127 to converter 129, which converts channel 6 to channel 34. The reason channel 6 is converted to channel 34 is readily apparent by looking at SCC-3 in FIG. 2. There splitter 83 connects channel 34 into the D group filter, and channels from the D group are supplied directly to the D group amplifier which is connected to the combiner 91, which is connected to send signals to SCC-1. The channel 34 is directed to the laser combiner 123, which transmits the channel 34 information as an optical signal on fiber 71. The signal arrives at combiner 83 and is selected by the D group filter 87, which directs the channel 34 over the matrix 89 to the D group amplifier 91 connected to the combiner 93, which is connected to the fiber 71 for transferring the signal to SCC-1. The signal arrives at SCC-1 in converter 133, where channel 34 is switched by remote controls 135 and 137 to channel 23. Switch 139 places channel 23 on feeder 6, which is connected to the subscriber 01-24-23-06, completing the two-way universal access connection.

In all cases, the fibers 71 are provided with optical laser transmitters 141 and optical receivers 143, which convert the optical signal along fiber 71 to an electronic signal.

Figure 4:
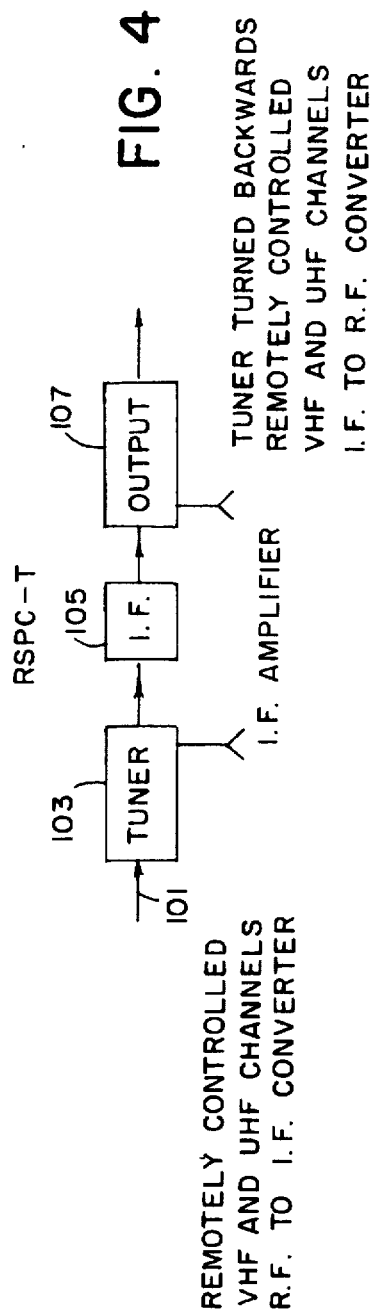
FIG. 4 is a schematic representation of remote switching and processing converter-transmit (RSPC-T) of the present invention.

FIG. 4 shows one of the keys to the operation of the schematic diagram. The signal which comes from one subscriber on a remotely controlled VHF and UHF channel 101 is fed to a tuner 103, which converts that signal to an intermediate frequency 105. The intermediate frequency is provided to an output 107, which is a reversed tuner and which converts that frequency to the frequency for any one of the remotely controlled VHF or UHF channels which is associated with the subscriber. That information that leaves the output 107 is switched according to information contained in the signal to the appropriate switching control center 53, and then, according to the information within the signal, the information is switched by a remotely controlled VHF or UHF channel 103 to the head end 57, and then out to the remote switching control center 53, where information with the signal further causes the RSPC-T on the remote switching control center 53 to direct the signal through a private channel on a feeder 59 to an individual subscriber 61–69.

A feeder has several subscribers' individual channels on one feeder. For example, a feeder may supply twenty-four or more subscribers, each with two channels, so that each feeder has about fifty channels, for example. Each switching control center would have, for example, about ten feeders.

While the invention has been described with reference to specific embodiments, modifications and variations of the invention may be constructed without departing from the scope of the invention, which is defined in the following claims.

I claim:

1. An interactive communication method, comprising transmitting a first signal from a subscriber in a first channel on a first feeder, remotely switching the first signal to a first converter, remotely switching the first converter and converting the signal on the first channel to a second signal on a second channel, combining signals from multiple second channels, applying the combined signals to a first optical laser transmitter at a switching control center, providing first optical signals from the laser transmitter over first fiber optic cables to a head end, receiving the first optical signals and converting the first optical signals to electronic signals at a head end, splitting the electronic signals, filtering the electronic signals and dividing the signals into groups of channels, matrixing the groups of channels to amplifiers associated with other switching control centers, combining grouped channels from amplifiers associated with single switching control centers, converting the combined grouped channels into second optical signals with a second optical laser transmitter, transmitting the second optical signals over second optical fibers to a remote switching control center, converting the second optical signals to electronic channel signals, switching the electronic channel signals to second converters, converting the electronic channel signals to third channel signals, and supplying the third channel signals to a feeder and via the feeder to a receiving subscriber.

2. The method of claim 1, wherein the receiving subscriber transmits to the first transmitting subscriber over third, fourth and fifth channels, respectively, repeating the steps and sequences as set forth in claim 1.

3. The method of claim 1, wherein the converting comprises receiving a first channel signal in a tuner, remotely controlling the tuner, converting the first channel signal to an intermediate frequency in an IF amplifier, and providing the intermediate frequency signal to an output which is a tuner turned backwards, remotely controlling the output and producing a signal on another channel.

4. The method of claim 1, further comprising connecting multiple switching control centers to a head end with fiber optic cables and sending optical signals over the fiber optic cables back and forth between the switching control centers and the head end.

5. The method of claim 1, further comprising sending channel signals back and forth to subscribers located near the switching control centers via coaxial cables.

6. The method of claim 1, further comprising providing universal access between subscribers throughout switching control center areas.

7. The method of claim 1, further comprising providing universal access between subscribers in switching control centers remote from each other.

8. The method of claim 1, further comprising providing universal access between subscribers connected to switching control centers via the switching control centers, the head ends via geographically remote head ends.

9. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein some of the outputs from the remote switching and processing converter transmit are connected to an optical fiber for transmission through the optical fiber to the head end switching control center, and then through another optical fiber to another subsidiary switching control center for placing on a subscriber allocated channel on a feeder line and for transmitting the signal to a subscriber's remote switching and processing converter which is connected to a subscriber's allocated channel.

10. The apparatus of claim 1, wherein distant subsidiary SCC's are automatically connected to each other via the area HEADEND using single-mode optical fibers.

11. The apparatus of claim 1, wherein each subsidiary SCC is allocated a designated spectrum of frequencies for automated reception of incoming 2-way channels.

12. The apparatus of claim 1, wherein each subsidiary SCC can receive additional one-way and interactive channels on the same and additional optical fibers.

13. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein the transmit RF channels include a digitally modulated subcarrier that includes the address of the designated subsidiary SCC and subscriber.

14. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein each subsidiary SCC can transmit the entire spectrum of 2-way channels to the headend for automatic distribution to other subsidiary SCC's.

15. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein RSPC-T's amplify the transmitted channels from users within the subsidiary SCC and convert them to other subsidiary SCC's designated receive spectrum.

16. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein each RSPC-T can select from many incoming subscriber designated channels and provide a choice of designated transmit RF channels.

17. An automated optoelectronic switched distribution apparatus, comprising a head end switching control center, plural optical fibers having proximal ends and distal ends, proximal ends of the optical fibers being connected to the head end switching control center, plural subsidiary switching control centers (SCC) connected to distal ends of the optical fibers, plural coaxial feeders having proximal ends connected to the subsidiary switching control centers, and plural subscribers connected to each feeder, each feeder carrying about fifty channels and each subscriber being connected to two allocated channels from the feeder, the subsidiary switching control center having remote switching and processing converters (RSPC-T) for receiving signals from the optical fibers and transmitting the signals to an allocated channel to an individual subscriber, each subsidiary switching control center having remote switching and processing converter-transmit to receive signals from a subscriber's allocated transmit RF channel and to direct that signal to an output channel, wherein nearby subsidiary SCC's can be automatically connected to each other using coaxial cable 2-way VHF designated channels, thus enabling an SCC with a limited number of 2-way users to access another and thereby greatly reduce 2-way optical transmission costs by frequency division and time-sharing of the same single-mode optical laser and fiber.

* * * * *

UNITED STATES PATENT AND TRADEMARK OFFICE
CERTIFICATE OF CORRECTION

PATENT NO. : 5,697,047

DATED : December 9, 1997

INVENTOR(S) : Victor Nicholson

It is certified that error appears in the above-identified patent and that said Letters Patent is hereby corrected as shown below:

<u>In the Claims</u>:

Claim 10, line 1, change "1" to --9--.

Claim 11, line 1, change "1" to --9--.

Claim 12, line 1, change "1" to --9--.

Signed and Sealed this

Thirty-first Day of March, 1998

*Attest:*

BRUCE LEHMAN

*Attesting Officer*        *Commissioner of Patents and Trademarks*